(12) United States Patent
Bang et al.

(10) Patent No.: US 11,336,630 B2
(45) Date of Patent: May 17, 2022

(54) DEVICE IN MULTICAST GROUP

(71) Applicant: UNIONPLACE CO., LTD., Seoul (KR)

(72) Inventors: Seongcheol Bang, Bucheon-si (KR); Jaewon Cha, Seoul (KR); Seungchul Kwak, Goyang-si (KR)

(73) Assignee: UNIONPLACE CO., LTD., Seoul (KR)

( * ) Notice: Subject to any disclaimer, the term of this patent is extended or adjusted under 35 U.S.C. 154(b) by 299 days.

(21) Appl. No.: 16/723,886

(22) Filed: Dec. 20, 2019

(65) Prior Publication Data
US 2020/0366658 A1  Nov. 19, 2020

(30) Foreign Application Priority Data

Nov. 15, 2018 (KR) .................... 10-2018-0140506

(51) Int. Cl.
*H04L 29/06* (2006.01)

(52) U.S. Cl.
CPC ........ *H04L 63/061* (2013.01); *H04L 63/0428* (2013.01)

(58) Field of Classification Search
CPC ....... H04L 9/14; H04L 9/3242; H04L 9/0833; H04L 9/0897; H04L 63/061; H04L 63/0428; H04L 2209/805
USPC ........................................................ 713/171
See application file for complete search history.

(56) References Cited

U.S. PATENT DOCUMENTS

| | | | | |
|---|---|---|---|---|
| 7,434,046 B1* | 10/2008 | Srivastava | ............ | H04L 9/0825 380/264 |
| 7,502,927 B2* | 3/2009 | Trostle | .................. | H04L 9/0833 705/51 |
| 8,885,830 B2* | 11/2014 | Tahan | ................. | H04W 12/068 380/262 |
| 9,106,413 B2* | 8/2015 | Kim | .................... | H04L 63/0807 |
| 10,051,469 B2* | 8/2018 | Abraham | .......... | H04W 72/1205 |
| 10,230,696 B2* | 3/2019 | Smith | ................. | H04L 67/2809 |
| 11,128,528 B2* | 9/2021 | Nolan | ................. | H04L 61/2069 |

FOREIGN PATENT DOCUMENTS

| | | |
|---|---|---|
| KR | 10-2012-0015312 A | 2/2012 |
| KR | 10-2013-0006069 A | 1/2013 |
| KR | 10-2014-0006996 A | 1/2014 |

(Continued)

*Primary Examiner* — Amare F Tabor
(74) *Attorney, Agent, or Firm* — Stein IP, LLC

(57) ABSTRACT

A device in a multicast group includes an encryptor/decryptor, a key storage, a security interface and a data processing requestor. The security interface performs receiving and storing a group key and a publisher key from and in the key storage when the device is registered as a publisher, and receiving and storing the group key from and in the key issuing when the device is registered as a subscriber; receiving a request for encrypting first data from the data processing requestor; determining whether the device is an authorized publisher; and transmitting the first data and the read group key to the encryptor/decryptor when the result of the determining indicates the device is the authorized publisher; receiving a first encrypted data generated by encrypting the first data using the group key; and transmitting the first encrypted data to the data processing requestor.

13 Claims, 8 Drawing Sheets

(56) References Cited

FOREIGN PATENT DOCUMENTS

| KR | 10-2017-0089747 A | 8/2017 |
|----|-------------------|--------|
| KR | 10-1840430 B1 | 3/2018 |
| KR | 10-2018-0080410 A | 7/2018 |
| KR | 10-1940983 B1 | 1/2019 |
| WO | WO 02/01799 A2 | 1/2002 |
| WO | WO 2004/025895 A1 | 3/2004 |

\* cited by examiner

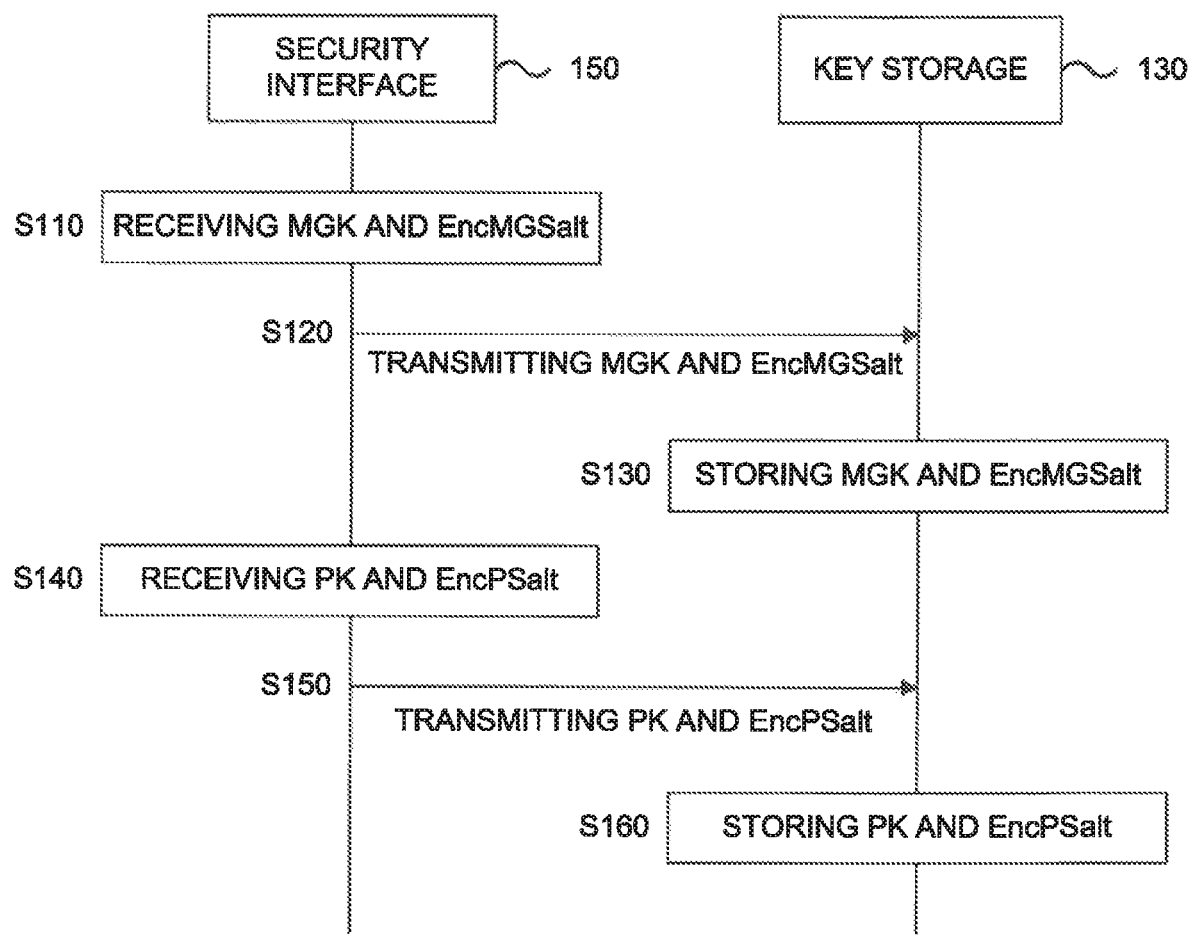

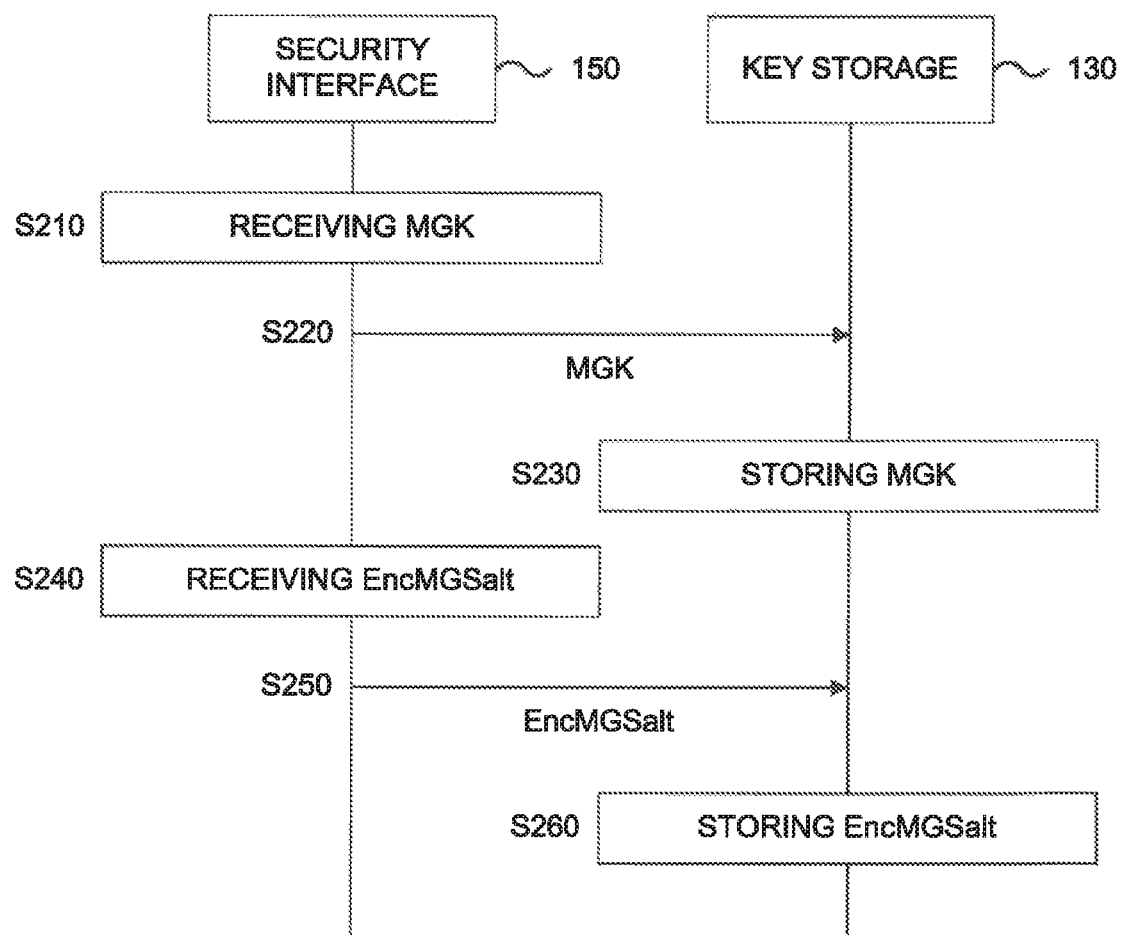

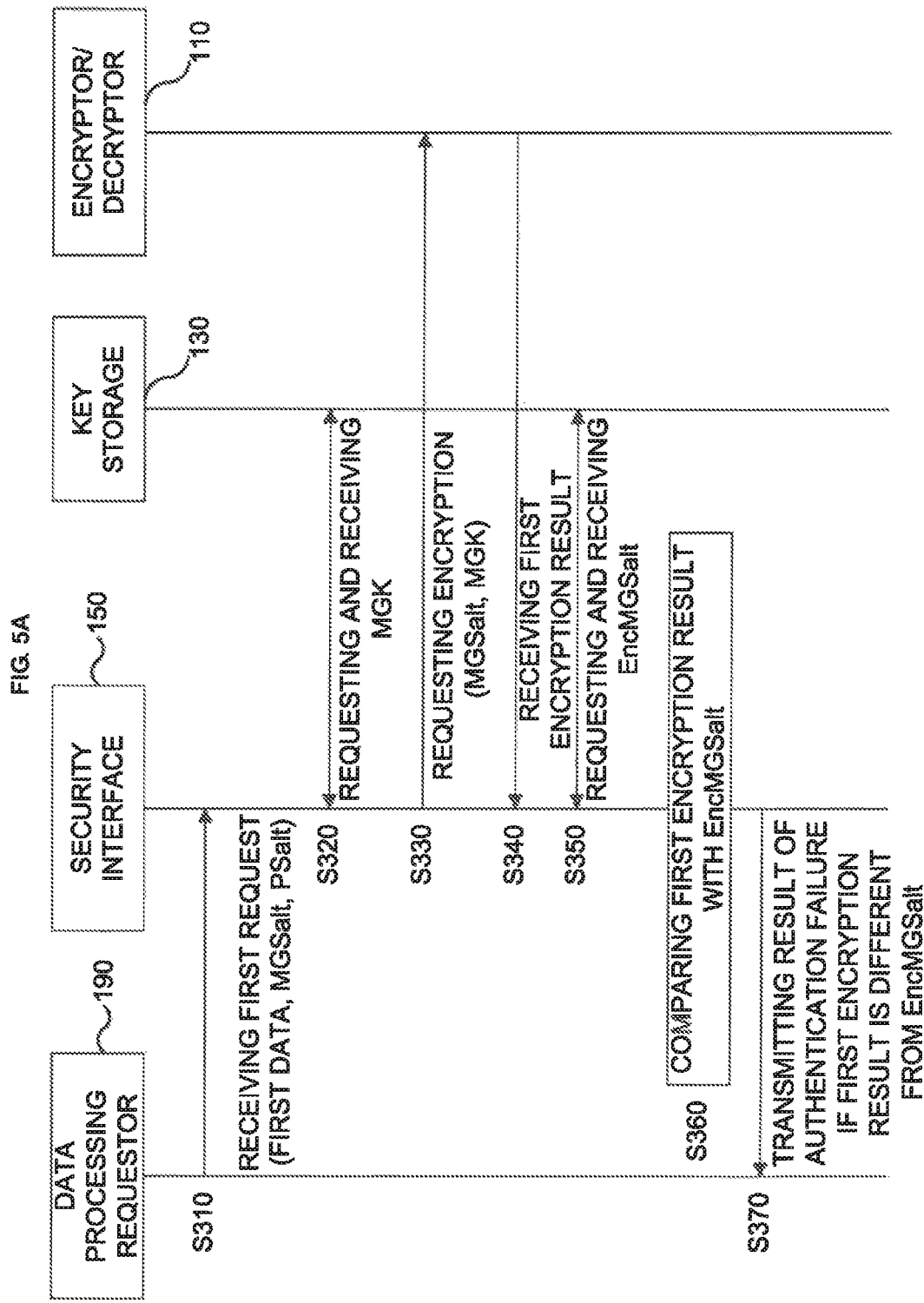

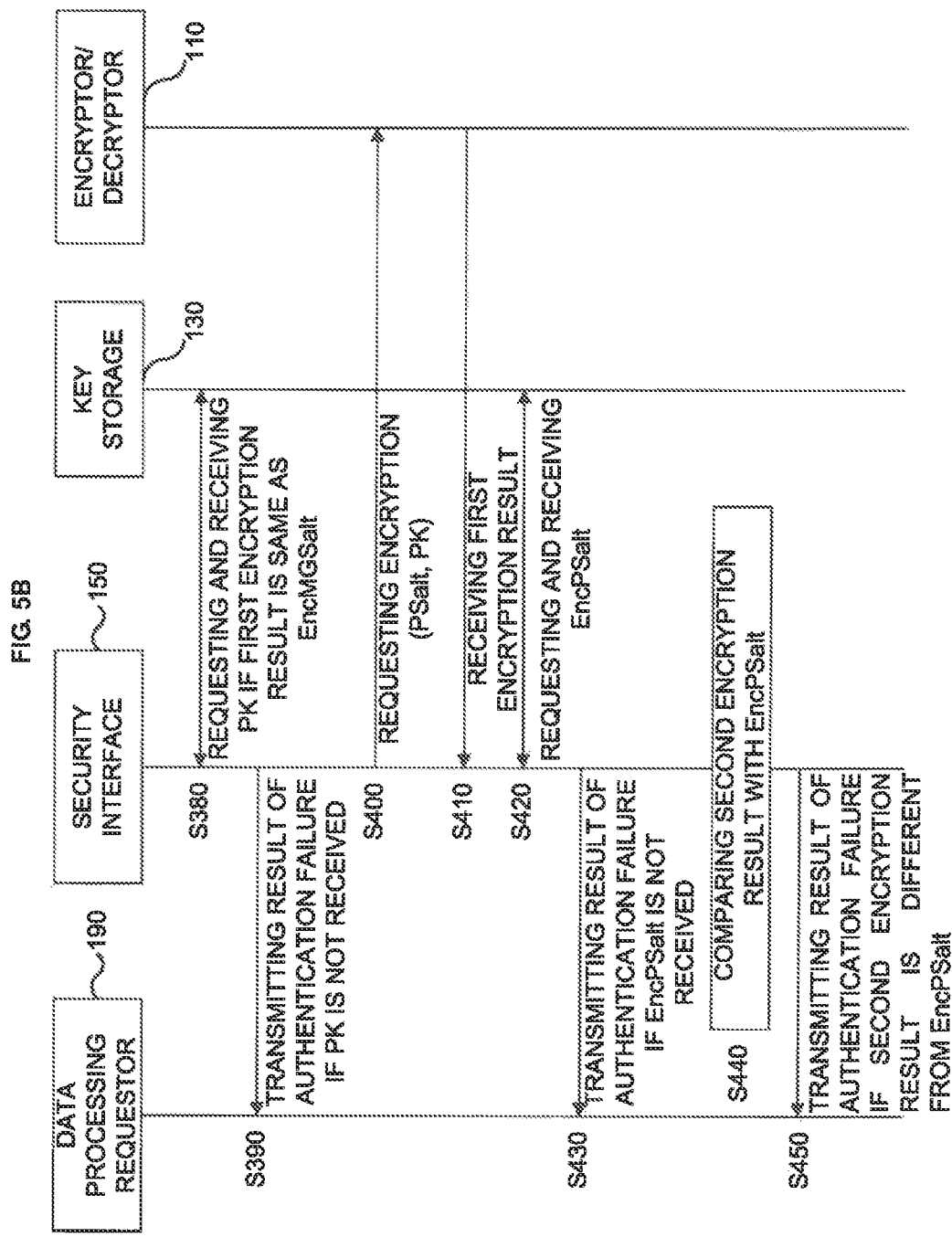

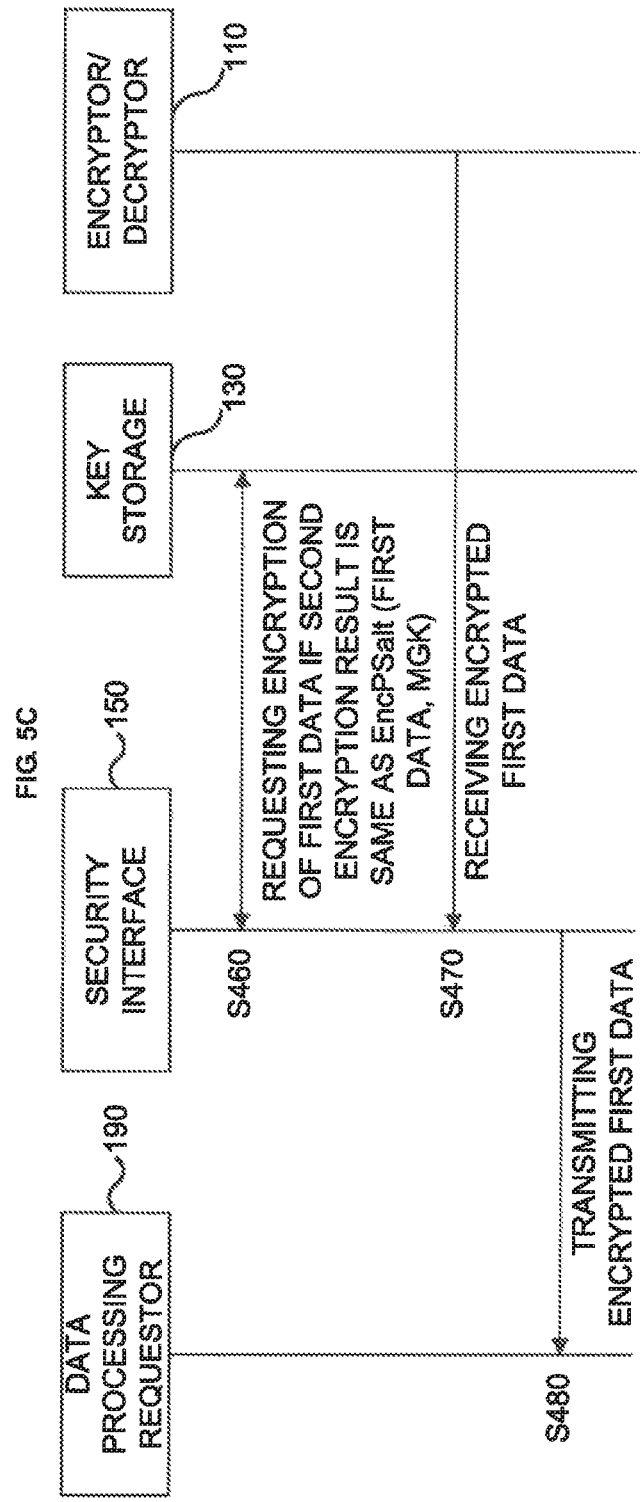

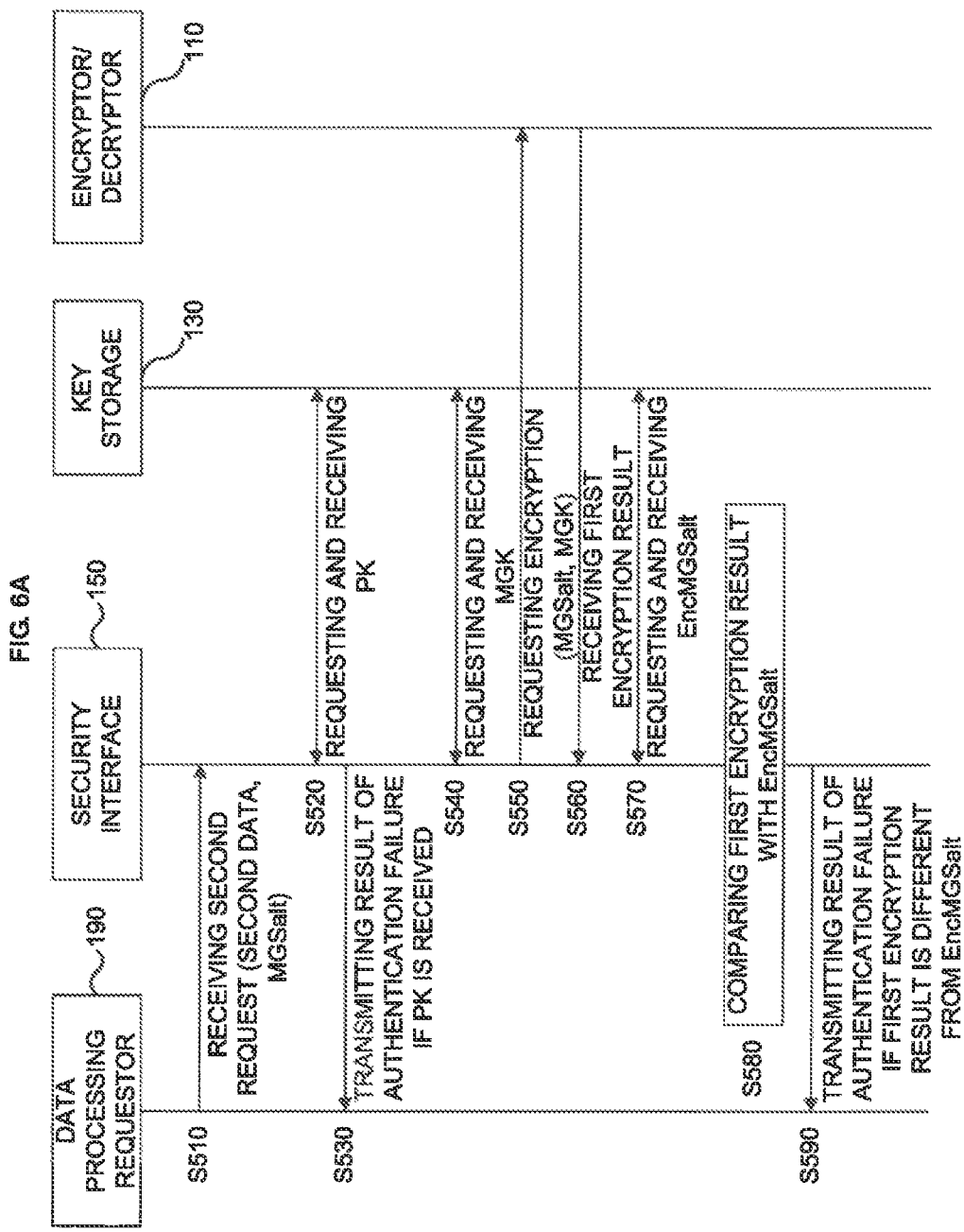

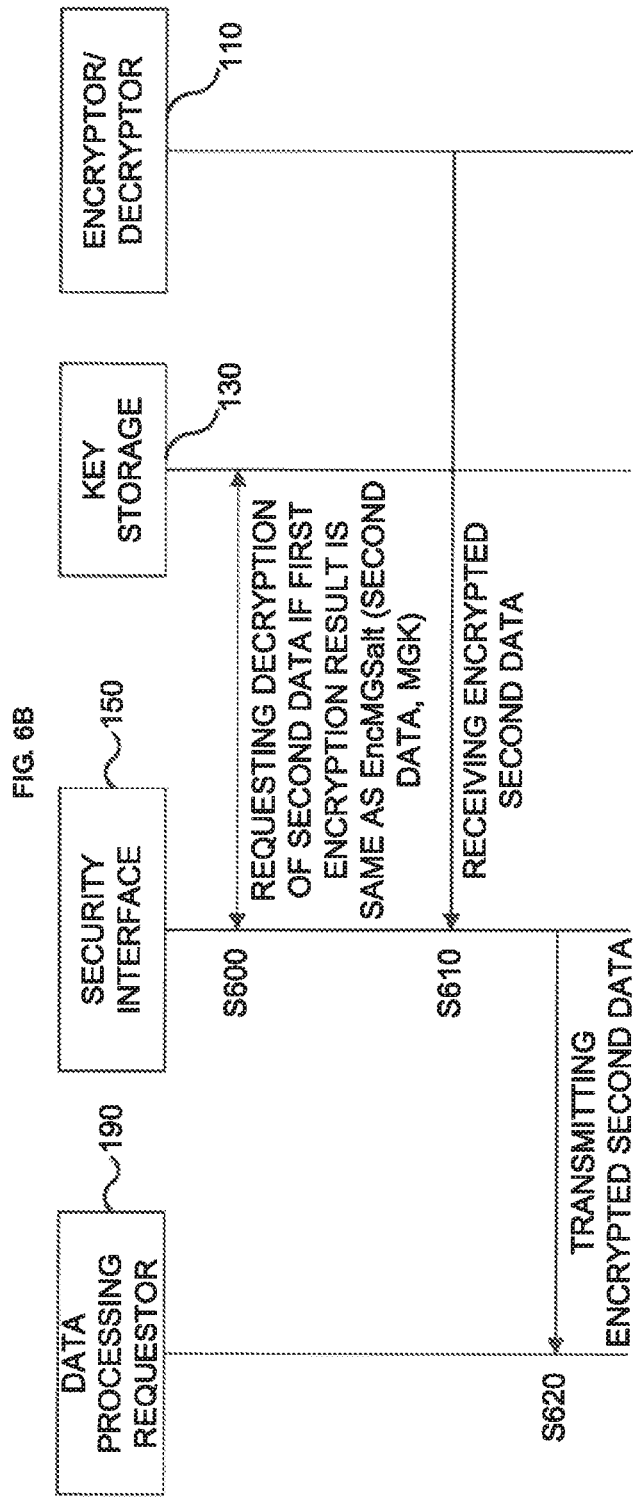

DEVICE IN MULTICAST GROUP

CROSS-REFERENCE TO RELATED PATENT APPLICATION

This application claims priority under 35 U.S.C. § 119 of Korean Patent Application No. 10-2018-0140506, filed on Nov. 15, 2018, in the Korean Intellectual Property Office, the entire contents of which are hereby incorporated by reference.

BACKGROUND

1. Field

The present disclosure relates to a device in a multicast group, and more particularly, to a device in a multicast group that encrypts data only when the device is identified as an authorized publisher in the multicast group.

The technique of the present disclosure was developed with the support of the research project of the Ministry of Trade, Industry and Energy (MOTIE), which is managed by the Korea Institute for Advanced Technology (KIAT) (Project Title: "Development of distributed ultra-high-speed CPS Secure MCU that meets UL2900 cybersecurity standard," Project Number: S2640292).

2. Description of the Related Art

A publisher-subscriber pattern is one of asynchronous messaging patterns. The publisher-subscriber pattern is used where a sender (generally referred to as "publisher") multicasts data (hereinafter, also referred to as "message") to one or more receivers (generally referred to as a "subscriber") in a multicast group. The multicast group includes a plurality of devices, one of which is designated as a publisher and the other of which is/are designated as subscriber(s). That is, in general, there is one publisher and one or more subscribers in a specific multicast group. According to the publisher-subscriber pattern, the publisher generally does not know which subscribers will receive the message, and the subscribers may receive the messages that are of interest without knowledge of the publisher. The publisher-subscriber pattern may be used for sending messages to subscribers from a publisher, for example, in a multicast group including a plurality of devices used for wireless communication. Alternatively, the publisher-subscriber pattern may also be used for sending messages to subscribers from a publisher, for example, in a multicast group including a plurality of devices used for Internet of Things (IoT) communication.

In the publisher-subscriber pattern, there may be a broker between the publisher and the subscriber. For example, the publisher registers a multicast group with the broker according to the publisher-subscriber pattern, and sends messages classified based on the topics. The subscribers register subscriptions to multicast groups with the broker. That is, based on information on the topics provided by the broker, the subscriber may subscribe to a multicast group having a specific topic and receive a message published to the specific topic.

As described above, the publisher does not know which subscribers will receive the message. Therefore, an unauthorized device may receive the message. Thus, in order to prevent unauthorized devices (i.e., devices other than devices in the multicast group) from receiving messages, encryption keys (hereinafter, referred to as "group key") for identifying devices in the multicast group may be used. The publisher encrypts the messages using the group key and sends the encrypted messages to the subscribers, and the subscribers decrypt the received encrypted messages using the group key. As an example of the group key, a symmetric key may be used. For example, Korean Patent Application Publication No. 10-2014-0006996 (Patent Document 1) entitled "Traffic encryption key management for machine-to-machine multicast Group" filed on Feb. 26, 2012, by LG Electronics INC. and published on Jan. 16, 2014, discloses a method of updating a group traffic key (that is, "group key" in the present disclosure) used to encrypt and decrypt multicast data (i.e., a message).

As described above, the subscribers may receive the messages that are of interest without knowledge of the publisher. Thus, even if an unauthorized device publishes and sends messages, the subscribers may receive those messages. In this connection, a message authentication code (generally referred to as "MAC") may be used to prevent the unauthorized device from sending messages and to prevent the subscribers from receiving the messages by misunderstanding that the messages are sent by the authorized publisher. For example, Korean Patent Application Publication No. 10-2017-0089747 (Patent Document 2) entitled "System and method for authentication of things" filed on Oct. 17, 2016, by LG Electronics INC. and published on Aug. 4, 2017, discloses a method of using a message authentication code for authentication in the Internet of Things. For example, the message authentication code can be generated using a hash function. The publisher adds the message authentication code to the message and then sends the message with the message authentication code to the subscriber. The subscriber compares a result of an operation of the received message using the hash function with the message authentication code included in the received message. If the operation result and the message authentication code are identical, the message can be regarded as the one that is sent by the authorized publisher.

For example, both of the group key and the message authentication code may be used to prevent the unauthorized device from receiving a message and also prevent the unauthorized device from publishing a message.

For example, according to an encrypt-then-MAC approach, a message is first encrypted using a group key. A message authentication code is then generated using the encrypted message and the group key. Then, the message authentication code is added to the encrypted message. The publisher combines the encrypted message and the message authentication code and then sends the combined data to the subscriber. For example, according to an encrypt-and-MAC approach, a message is encrypted using a group key. Further, a message authentication code is generated using the message and the group key. The publisher combines the encrypted message and the message authentication code and then sends the combined data to the subscriber. According to the encrypt-then-MAC approach, the message authentication code is generated by using the encrypted message and the group key. According to the encryption-and-MAC approach, the message authentication code is generated by using the message (i.e., the message before being encrypted) and the group key. Further, for example, according to a MAC-then-encrypt approach, a message authentication code is first generated using a message and a group key. The message and the message authentication code are then encrypted using the group key. The publisher sends the encrypted data, i.e., the encrypted data including the encrypted message and the encrypted message authentication code, to the subscriber.

In using any one of the encrypt-then-MAC approach, the encrypt-and-MAC approach and the MAC-then-encrypt approach, the subscriber receives the encrypted message and the message authentication code that may or may not be encrypted, and then whether the encrypted message is sent from an authorized publisher can be determined using, for example, the group key and the hash function associated with the message authentication code. Once it is determined that the encrypted message has been sent from the authorized publisher, the subscriber receives the encrypted message while regarding this encrypted message as the message sent by the authorized publisher.

However, even when the group key and the message authentication code are used as described above, there may be still security problems. Let us suppose a case where a specific device in a multicast group is hacked. The specific device has knowledge of the group key and the hash function associated with the message authentication code. Thus, if the specific device transmits the malformed data to other devices in the multicast group by using the encrypt-then-MAC approach, other devices, i.e., the subscribers, in the multicast group regard these malformed data as the data sent from the publisher.

PATENT DOCUMENTS

1. Korean Patent Application Publication No. 10-2014-0006996
2. Korean Patent Application Publication No. 10-2017-0089747

SUMMARY

In accordance with an aspect of the present disclosure, there is provided a device in a multicast group that encrypts data using a group key only when the device is identified as an authorized publisher in the multicast group, so as to prevent a device other than the authorized publisher from publishing the data by encrypting the data using the group key.

In accordance with another aspect of the present disclosure, there is provided a device in a multicast group that decrypts data using a group key only when the device is identified as an authorized subscriber in a multicast group, so as to prevent a device other than the authorized subscriber from receiving the data by decrypting the data using the group key.

In accordance with the aspects of the present disclosure, the data is encrypted by using a group key only when the device is identified as the authorized publisher in the multicast group, so that it is possible to prevent a device other than the authorized publisher from publishing the data by encrypting the data using the group key. Further, the data is decrypted by using the group key only when the device is identified as the authorized subscriber in the multicast group, so that it is possible to prevent a device other than the authorized subscriber from receiving the data by decrypting the data using the group key.

BRIEF DESCRIPTION OF THE DRAWINGS

FIG. 3 is a flowchart showing an example of a process of storing a key in a key storage by a security interface of the device according to the embodiment.

FIG. 4 is a flowchart showing another example of a process of storing a key in the key storage by the security interface of the device according to the embodiment.

FIGS. 5A to 5C are flowcharts showing an example of a process in which the security interface of the device according to the embodiment encrypts first data in response to a first request.

FIGS. 6A and 6B are flowcharts showing an example of a process in which the security interface of the device according to the embodiment decrypts second data in response to a second request.

DETAILED DESCRIPTION

Figure 1:
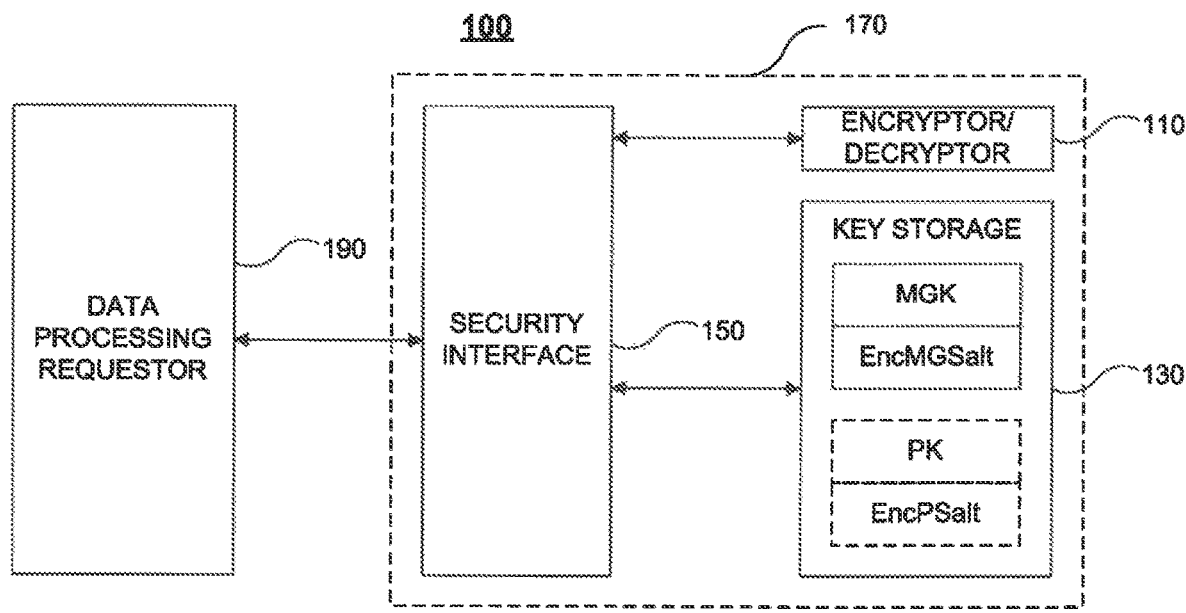
FIG. 1 shows an exemplary configuration of a device in a multicast group according to an embodiment of the present disclosure.

Hereinafter, embodiments of devices in a multicast group according to the techniques of the present disclosure will be described in detail with reference to the accompanying drawings. Meanwhile, in the drawings for describing the embodiments of the techniques of the present disclosure, only a part of the practical configurations may be illustrated, a part of the practical configurations may be omitted or changed, and relative dimensions and proportions of parts therein may be exaggerated or reduced in size for the sake of convenience of description.

EMBODIMENTS

FIG. 1 shows an exemplary configuration of a device in a multicast group according to an embodiment of the present disclosure.

Referring to FIG. 1, a device 100 according to the embodiment includes an encryptor/decryptor 110, a key storage 130, a security interface 150, and a data processing requestor 190.

Figure 2:
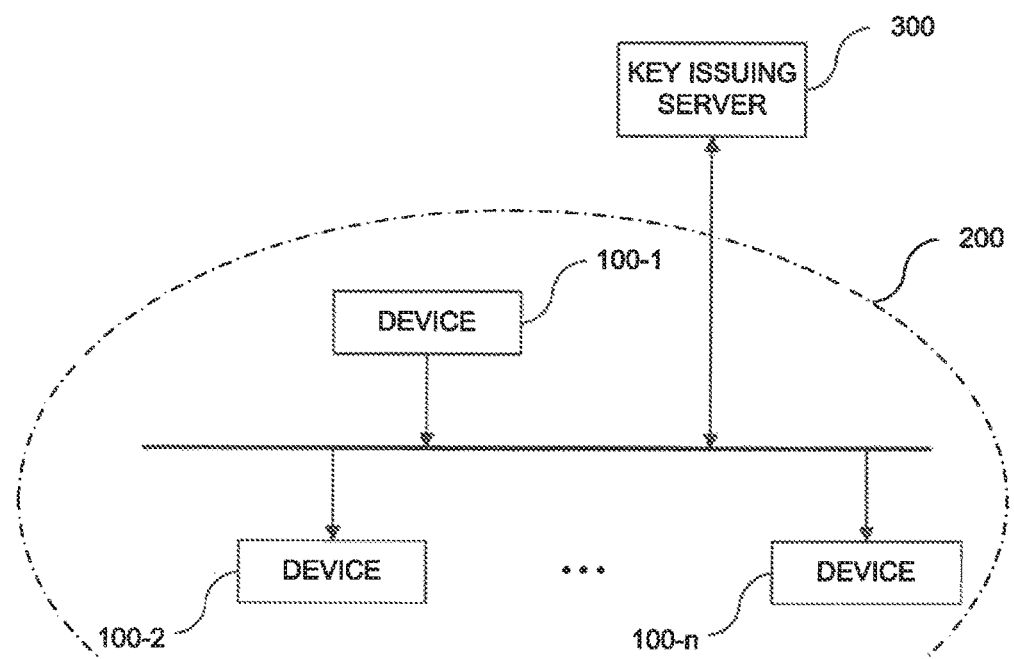
FIG. 2 shows an exemplary configuration of the multicast group including the device according to the embodiment.

The device 100 may be a publisher or a subscriber in a multicast group 200 shown in FIG. 2.

The encryptor/decryptor 110, the security interface 150, and the data processing requestor 190 may be implemented by a semiconductor device such as a CPU. For example, the encryptor/decryptor 110, the security interface 150, and the data processing requestor 190 may be implemented by a single CPU. The key storage 130 may be implemented by a semiconductor device such as a semiconductor memory.

The encryptor/decryptor 110 is configured to encrypt or decrypt data. In the case where the device 100 is the publisher in the multicast group 200 shown in FIG. 2, the encryptor/decryptor 110 encrypts data using a key. On the other hand, in the case where the device 100 is the subscriber in the multicast group 200 shown in FIG. 2, the encryptor/decryptor 110 decrypts data using a key.

The key storage 130 stores a key. The key storage 130 may store, e.g., a group key (denoted by "MGK" in FIG. 1). The key storage 130 may store, e.g., the group key and a publisher key (denoted by "PK" in FIG. 1). The key storage 130 may further store, e.g., an encrypted group salt (denoted by "EncMGSalt" in FIG. 1) in association with the group key. The key storage 130 may further store, e.g., an encrypted publisher salt (denoted by "EncPSalt" in FIG. 1) in association with a publisher key. Each key and each salt will be described in detail later.

The security interface 150 is connected to the encryptor/decryptor 110 and the key storage 130. The encryptor/ decryptor 110 and the key storage 130 have an encryption/decryption function and a key storage function that are extremely sensitive to the security. Therefore, it is preferred that the encryptor/decryptor 110 and the key storage 130 are configured to be accessible only through the security interface 150. The detailed configuration of the security interface 150 will be described later.

Further, it is preferred that the encryptor/decryptor 110, the key storage 130, and the security interface 150 are provided in a security module 170 that has a high security level. The security module 170 may be manufactured according to any one of, e.g., Europay, MasterCard and Visa (EMV) standard and a trusted execution environment (TEE) standard.

The data processing requestor 190 is configured to transmit a request for processing the data by the encryptor/decryptor 110 to the security interface 150, and receive a processing result of the request from the security interface 150. As described above, since the encryptor/decryptor 110 and the key storage 130 are extremely sensitive to the security, the data processing requestor 190 cannot be directly connected to the encryptor/decryptor 110 and the key storage 130. Therefore, the data processing requestor 190 may transmit the request described above only to the security interface 150.

FIG. 2 shows an exemplary configuration of a multicast group including devices according to the embodiment.

Referring to FIG. 2, the multicast group 200 includes a plurality of devices that are, e.g., a first device 100-1 and a second device 100-2 to an n-th device 100-n ('n' is a natural number of 2 or more). It is preferred that each of the first device 100-1 and the second device 100-2 to the n-th device 100-n is configured to be substantially same as the device 100 described above. For example, the first device 100-1 may operate as the publisher in the multicast group 200, and the second device 100-2 to the n-th device 100-n may operate as the subscribers in the multicast group 200.

The key issuing server 300 is configured to provide keys for a plurality of devices in the multicast group 200, for example, the first device 100-1, and the second device 100-2 to the n-th device 100-n. It is preferred that the key issuing server 300 operates as a broker (not shown) of the multicast group 200. However, the key issuing server 300 may also be provided separately from the broker.

The key issuing server 300 issues a group key and a publisher key for the publisher in the multicast group 200 and issues a group key for the subscribers in the multicast group 200. When the key issuing server 300 operates as the broker (not shown) of the multicast group 200, the key issuing server 300 issues the group key and the publisher key for the publisher in the process of registering the publisher and also issues the group key for the subscribers in the process of registering the subscribers.

Next, a process of issuing a key between the device 100 and the key issuing server 300 when the device 100 is the publisher of the multicast group 200 will be described.

As described above, the device 100 may transmit a request for creating the multicast group 200 to the broker. Then, the broker creates the multicast group 200 and registers the device 100 as a publisher of the multicast group 200. After the broker registers the device 100 as the publisher of the multicast group 200, the device 100 transmits a request for issuing a group key and a publisher key to the key issuing server 300. Here, the key issuing server 300 may operate as the broker of the multicast group 200. If the key issuing server 300 is provided separately from the broker, the device 100 first receives identification information of the key issuing server 300 through the broker and transmits the request for issuing the group key and the publisher key to the key issuing server 300 based on the identification information of the key issuing server 300. The request for issuing the group key and the publisher key may include, e.g., a group salt and a publisher salt. The group salt may include identification information of the multicast group 200, and the publisher salt may include identification information of the device 100. The key issuing server 300 issues the group key using the group salt and a master key and issues the publisher key using the publisher salt and the group key. The group key is derived by using the group salt, and the publisher key is derived by using the publisher salt. The key issuing server 300 may store the group salt and the publisher salt in an internal database. The process of deriving the group key and the publisher key is substantially same as the process of deriving the keys in the conventional case. Therefore, a detailed description of the process of deriving the group key and the publisher key from the key issuing server 300 will be omitted. However, when the key issuing server 300 derives the publisher key, the key issuing server 300 confirms the presence of the publisher key that has been already issued for the multicast group 200. If the publisher key has been already issued for the multicast group 200, the key issuing server 300 does not issue the publisher key.

Next, a process of issuing a key between the device 100 and the key issuing server 300 when the device 100 is the subscriber of the multicast group 200 will be described.

As described above, the device 100 may requests to the broker a list of multicast groups that are valid for the device 100 to be the subscriber. For example, the device 100 may transmit a request to subscribe to the multicast group 200 to the broker. Then, the broker registers the device 100 as the subscriber of the multicast group 200. After the broker registers the device 100 as the subscriber of the multicast group 200, the device 100 transmits a request for issuing a group key to the key issuing server 300. As described above, the key issuing server 300 may operate as the broker of the multicast group 200 or the key issuing server 300 may be provided separately from the broker. When the key issuing server 300 receives the request for issuing the group key, the key issuing server 300 searches and extracts a group salt for the multicast group 200 and issues the group key using the group salt and the master key. The process of deriving the group key is substantially same as the process of deriving the key in the conventional case. Therefore, a detailed description of the process of deriving the group key from the key issuing server 300 will be omitted.

Hereinafter, an operation of the security interface according to the present embodiment will be described in more detail.

If the device 100 is registered as the publisher in the multicast group 200, the security interface 150 receives the group key and the publisher key from the key issuing server 300 and stores them in the key storage 130. Further, if the device 100 is registered as the publisher in the multicast group 200, the security interface 150 may also receive an encrypted group salt and an encrypted publisher salt from the key issuing server 300 and stores them in the key storage 130. The encrypted group salt may be derived by encrypting a group salt using, e.g., the group key. The encrypted publisher salt may be derived by encrypting a publisher salt using, e.g., the publisher key. When the device 100 is registered as the subscriber in the multicast group 200, the security interface 150 receives the group key from the key issuing server 300 and stores the received group key in the key storage 130. Further, when the device 100 is registered as the subscriber in the multicast group 200, the security interface 150 may also receive the encrypted group salt from the key issuing server 300 and stores the encrypted group salt in the key storage 130. The encrypted group salt may be derived by encrypting the group salt using, e.g., the group key. Whether the device 100 is registered as the publisher or the subscriber in the multicast group 200 may be determined as follows. For example, when the device 100 transmits a request for creating the multicast group 200 to the broker, it is determined that the device 100 is registered as the publisher in the multicast group 200. Accordingly, along with the transmission of a request for issuing the group key and the publisher key from the device 100 to the key issuing server 300, the security interface 150 receives the group key and the publisher key from the key issuing server 300 and stores them in the key storage 130. Similarly, when the device 100 transmits a request to subscribe to the multicast group 200 to the broker, it is determined that the device 100 is registered as the subscriber in the multicast group 200. Therefore, along with the transmission of a request for issuing the group key from the device 100 to the key issuing server 300, the security interface 150 receives the group key from the key issuing server 300 and stores the received group key in the key storage 130.

FIG. 3 is a flowchart showing an example of a process of storing a key in the key storage by the security interface of the device according to the embodiment.

Referring to FIG. 3, an example of a process in which the security interface 150 stores a key in the key storage 130 when the device 100 is registered as the publisher in the multicast group 200 is illustrated.

First, the security interface 150 receives a group key and an encrypted group salt from the key issuing server 300 (step S110). Then, the security interface 150 transmits the group key and the encrypted group salt to the key storage 130 (step S120). The key storage 130 stores the group key and the encrypted group salt transmitted from the security interface 150 (step S130). Next, the security interface 150 receives a publisher key and an encrypted publisher salt from the key issuing server 300 (step S140). Then, the security interface 150 transmits the publisher key and the encrypted publisher salt to the key storage (step S150). The key storage 130 stores the publisher key and the encrypted publisher salt transmitted from the security interface 150 (step S160).

FIG. 4 is a flowchart showing another example of a process of storing a key in the key storage by the security interface of the device according to the embodiment.

Referring to FIG. 4, an example of a process in which the security interface 150 stores a key in the key storage 130 when the device 100 is registered as the subscriber in the multicast group 200 is illustrated.

First, the security interface 150 receives a group key from the key issuing server 300 (step S210). Then, the security interface 150 transmits the group key to the key storage 130 (step S220). The key storage 130 stores the group key transmitted from the security interface 150 (step S230). Next, the security interface 150 receives the encrypted group salt from the key issuing server 300 (step S240). Then, the security interface 150 transmits the encrypted group salt to the key storage (step S250). The key storage 130 stores the encrypted group salt transmitted from the security interface 150 (step S260).

<Example of Configuration of Security interface in Encrypting Data>

The security interface 150 may be configured to perform a process of receiving a first request for encrypting first data from the data processing requestor 190; a process of determining whether or not the device 100 is an authorized publisher in the multicast group 200; a process of transmitting the first data and the group key read from the key storage 130 to the encryptor/decryptor 110 if the device 100 is determined as the authorized publisher; a process of receiving, from the encryptor/decryptor 110, a first encrypted data that is generated by encrypting the first data using the group key by the encryptor/decryptor 110; and a process of transmitting the first encrypted data to the data processing requestor 190. On the other hand, if the device 100 is not determined as the authorized publisher, the security interface 150 may perform a process of transmitting, to the data processing requestor 190, a result that the encryption of the first data in response to the first request is failed.

FIGS. 5A to 5C are flowcharts showing an example of a process in which the security interface of the device according to the embodiment encrypts the first data in response to the first request.

Referring to FIG. 5A, the security interface 150 receives a first request transmitted from the data processing requestor 190 (step S310). It is preferred that the first request includes first data, a group salt (denoted by "MGSalt" in FIG. 5A) and a publisher salt (denoted by "PSalt" in FIG. 5A). Therefore, if the group salt and the publisher salt are unknown, the first request may not be generated normally. Accordingly, it becomes possible to prevent a device that is not aware of the group salt and the publisher salt from publishing data in multicast group 200. Then, the security interface 150 requests and receives the group key from the key storage 130 (step S320). Next, the security interface 150 transmits the group salt and the group key read from the key storage 130 to the encryptor/decryptor 110 to request the encryption of the group salt (step S330). Thereafter, the security interface 150 receives, from the encryptor/decryptor 110, a first encryption result that is generated by encrypting the group salt using the group key by the encryptor/decryptor 110 (step S340). Then, the security interface 150 requests and receives the encrypted group salt from the key storage 130 (step S350). Next, the security interface 150 compares the first encryption result and the encrypted group salt (step S360). If it is determined in step S360 that the first encryption result and the encrypted group salt are different from each other, the security interface 150 transmits, to the data processing requestor 190, a result that the encryption of the first data in response to the first request is failed (step S370). Specifically, the difference between the first encryption result and the encrypted group salt is caused by the fact that the device 100 cannot be authorized as a device of the multicast group 200. That is, the security interface 150 determines that the device 100 is not an authorized publisher in the multicast group 200. Therefore, the security interface 150 may transmit a result of the authentication failure to the data processing requestor 190, for example (step S370).

Referring to FIG. 5B, if it is determined in step S360 that the first encryption result and the encrypted group salt match with each other, the security interface 150 requests and receives the publisher key from the key storage 130 (step S380). If the security interface 150 fails to receive the publisher key in the process of receiving the publisher key from the key storage 130 in step S380 (that is, if the security interface 150 fails to read the publisher key from the key storage 130), the security interface 150 determines that the device 100 is not an authorized publisher in the multicast group 200. Specifically, the failure of reading the publisher key is often caused by the fact that the publisher key is not stored in the key storage 130. Therefore, when the security interface 150 fails to read the publisher key from the key storage 130, the security interface 150 may transmit a result of the authentication failure to the data processing requestor 190, for example (step S390).

If the security interface 150 receives the publisher key from the key storage 130 in step S380, the security interface 150 transmits the publisher salt and the publisher key read from the key storage 130 to the encryptor/decryptor 110 and requests the encryption of the publisher salt (step S400). Thereafter, the security interface 150 receives, from the encryptor/decryptor 110, a second encryption result that is generated by encrypting the publisher salt using the publisher key by the encryptor/decryptor 110 (step S410). Then, the security interface 150 requests and receives the encrypted publisher salt from the key storage 130 (step S420). If the security interface 150 fails to receive the encrypted publisher salt in the process of receiving the encrypted publisher salt from the key storage 130 in step S420 (that is, if the security interface 150 fails to read the encrypted publisher salt from the key storage 130), the security interface 150 determines that the device 100 is not the authorized publisher in the multicast group 200. Specifically, the failure of reading the encrypted publisher salt is often caused by the fact that the encrypted publisher salt is not stored in the key storage 130. Therefore, when the security interface 150 fails to read the encrypted publisher salt from the key storage 130, the security interface 150 may transmit a result of the authentication failure to the data processing requestor 190, for example (step S430). Next, upon receiving the encrypted publisher salt from the key storage 130 in step S420, the security interface 150 compares the second encryption result with the encrypted publisher salt (step S440). If it is determined in step S440 that the second encryption result and the encrypted publisher salt are different from each other, the security interface 150 transmits, to the data processing requestor 190, a result that the encryption of the first data in response to the first request is failed (step S450). Specifically, the difference between the second encryption result and the encrypted publisher salt is caused by the fact that the device 100 is not the authorized publisher in the multicast group 200. That is, the security interface 150 determines that the device 100 is not the authorized publisher in the multicast group 200. Therefore, the security interface 150 may transmit a result of the authentication failure to the data processing requestor 190, for example (step S450).

Referring to FIG. 5C, if it is determined in step S440 that the second encryption result and the encrypted publisher salt match with each other, the security interface 150 transmits the first data and the group key read from key storage 130 to the encryptor/decryptor 110 and requests the encryption of the first data (step S460). Thereafter, the security interface 150 receives, from the encryptor/decryptor 110, a first encrypted data that is generated by encrypting the first data using the group key by the encryptor/decryptor 110 (step S470). Next, the security interface 150 transmits the first encrypted data to the data processing requester 190 (step S480).

As described above, when the security interface 150 receives the first request for encrypting the first data from the data processing requestor 190, the security interface 150 determines whether or not the device 100 is the authorized publisher in the multicast group 200. Specifically, the security interface 150 determines whether or not the device 100 is the authorized publisher in the multicast group 200 based on information including a result of the comparison between the first encryption result and the encrypted group salt, the determination whether or not the publisher key is read, the determination whether or not the encrypted publisher salt is read, and a result of the comparison between the second encryption result and the encrypted publisher salt. Therefore, it is possible to effectively prevent a device other than the authorized publisher from publishing the data in the multicast group 200 by encrypting the data using the group key.

<Example of Configuration of Security interface in Decrypting Data>

The security interface 150 may be configured to perform a process of receiving a second request for decrypting second data from the data processing requestor 190; a process of determining whether or not the device 100 is an authorized subscriber in the multicast group 200; a process of transmitting the second data and the group key read from the key storage 130 to the encryptor/decryptor 110 if the device 100 is determined as the authorized subscriber; a process of receiving, from the encryptor/decryptor 110, a second decrypted data that is generated by decrypting the second data using the group key by the encryptor/decryptor 110; and a process of transmitting the second decrypted data to the data processing requestor 190. On the other hand, if the device 100 is not determined as the authorized subscriber, the security interface 150 may perform a process of transmitting, to the data processing requestor 190, a result that the decryption of the second data in response to the second request is failed. Further, if the security interface 150 can read the publisher key from the key storage 130, the security interface 150 may perform a process of determining that the device 100 is not the authorized subscriber in the multicast group 200.

FIGS. 6A and 6B are flowcharts showing an example of a process in which the security interface of the device according to the embodiment decrypts the second data in response to the second request.

Referring to FIG. 6A, the security interface 150 receives a second request transmitted from the data processing requestor 190 (step S510). It is preferred that the second request includes the second data and a group salt. Therefore, if the group salt is unknown, the second request may not be generated normally. Accordingly, it becomes possible to prevent a device that is not aware of the group salt from subscribing data in the multicast group 200. Then, the security interface 150 requests the publisher key to the key storage 130 and receives a result of the request from the key storage 130 (step S520). If the security interface 150 receives the publisher key from the key storage 130 in step S520, it is determined that the device 100 is the publisher in the multicast group 200. In other words, the security interface 150 determines that the device 100 is not an authorized subscriber in the multicast group 200. Therefore, the security interface 150 may transmit a result of the authentication failure to the data processing requestor 190, for example (step S530). Here, steps S520 and S530 may be optional. That is, the security interface 150 may perform step S540 immediately after step S510. Then, the security interface 150 requests and receives the group key from the key storage 130 (step S540). Next, the security interface 150 transmits the group salt and the group key read from the key storage 130 to the encryptor/decryptor 110 and requests the encryption of the group salt (step S550). Thereafter, the security interface 150 receives, from the encryptor/decryptor 110, a first encryption result that is generated by encrypting the group salt using the group key by the encryptor/decryptor 110 (step S560). Then, the security interface 150 requests and receives the encrypted group salt from the key storage 130 (step S570). Next, the security interface 150 compares the first encryption result and the encryption group salt (step S580). If it is determined in step S580 that the first encryption result and the encrypted group salt are different from each other, the security interface 150 transmits, to the data processing requestor 190, a result that the decryption of the second data in response to the second request is failed (step S590). Specifically, the difference between the first encryption result and the encrypted group salt is caused by the fact that the device 100 cannot be authorized as a device of the multicast group 200. That is, the security interface 150 determines that the device 100 is not an authorized subscriber in the multicast group 200. Therefore, the security interface 150 may transmit a result of the authentication failure to the data processing requestor 190, for example (step S590).

Referring to FIG. 6B, if it is determined in step S580 that the first encryption result and the encrypted group salt match with each other, the security interface 150 transmits the second data and the group key read from the key storage 130 to the encryptor/decryptor 110 to request the decryption of the second data (step S600). Thereafter, the security interface 150 receives, from the encryptor/decryptor 110, the second decrypted data that is generated by decrypting the second data using the group key by the encryptor/decryptor 110 (step S610). Then, the security interface 150 transmits the second decrypted data to the data processing requestor 190 (step S620).

As described above, when the security interface 150 receives the second request for encrypting the second data from the data processing requestor 190, the security interface 150 determines whether or not the device 100 is an authorized subscriber in the multicast group 200. Specifically, the security interface 150 determines whether or not the device 100 is the authorized subscriber in the multicast group 200 based on information including a result of the comparison between the first encryption result and the encrypted group salt and the determination whether or not the publisher key is present. Therefore, it is possible to effectively present a device other than the authorized subscriber from subscribing the data in the multicast group 200 by decrypting the data using the group key.

Other Embodiments

Although various embodiments of the present disclosure have been described in detail, the above descriptions merely illustrates the technical idea of the present disclosure, and it will be understood by those skilled in the art to which this present disclosure belongs that various changes and modifications may be made without departing from the scope of the essential characteristics of the present disclosure.

For example, when a device 100 is a publisher in the multicast group 200, the device 100 may send a message containing a message authentication code to subscribers in the multicast group 200. The message authentication code may be generated using the first data or the first encrypted data. For example, when a device 100 is a subscriber in the multicast group 200, the device 100 may receive a message including a message authentication code, and then authenticate the message using the message authentication code.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

In accordance with the embodiments of the present disclosure, the data is encrypted by using a group key only when the device is identified as the authorized publisher in the multicast group, so that it is possible to prevent a device other than the authorized publisher from publishing the data by encrypting the data using the group key. Further, the data is decrypted by using the group key only when the device is identified as the authorized subscriber in the multicast group, so that it is possible to prevent a device other than the authorized subscriber from receiving the data by decrypting the data using the group key.

<Explanation of Reference Symbols>

| | |
|---|---|
| 100: device | 110: encryptor/decryptor |
| 130: key storage | 150: security interface |
| 170: security module | 190: data processing requestor |
| 200: multicast group | 300: key issuing server |

What is claimed is:

1. A device in a multicast group, comprising:
an encryptor/decryptor configured to encrypt or decrypt data;
a key storage configured to store a key;
a security interface connected to the encryptor/decryptor and the key storage; and
a data processing requestor configured to transmit a request for processing the data by the encryptor/decryptor to the security interface and receive a processing result in response to the request from the security interface,
wherein the security interface performs the steps of:
(a) receiving a group key and a publisher key from a predetermined key issuing server and storing the group key and the publisher key in the key storage when the device is registered as a publisher in the multicast group, and receiving the group key from the key issuing server and storing the group key in the key storage when the device is registered as a subscriber in the multicast group;
(b) receiving a first request for encrypting first data from the data processing requestor;
(c) determining whether or not the device is an authorized publisher in the multicast group; and
(d) transmitting the first data and the group key read from the key storage to the encryptor/decryptor when the device is determined as the authorized publisher in the step (c), receiving, from the encryptor/decryptor, a first encrypted data that is generated by encrypting the first data using the group key by the encryptor/decryptor, and transmitting the first encrypted data to the data processing requestor,
wherein the group key is issued by the key issuing server using a group salt, and the publisher key is issued by the key issuing server using a publisher salt,
wherein the step (a) includes the step of:
(a-1) if the device is registered as the publisher in the multicast group, receiving from the key issuing server an encrypted group salt that is generated by encrypting the group salt using the group key by the key issuing server and an encrypted publisher salt that is generated by encrypting the publisher salt using the publisher key by the key issuing server, and storing the encrypted group salt and the encrypted publisher salt in the key storage, wherein the first request includes the first data, the group salt and the publisher salt, and wherein the step (c) includes the steps of:

(c-1) transmitting the group salt and the group key read from the key storage to the encryptor/decryptor, and receiving from the encryptor/decryptor a first encryption result that is generated by encrypting the group salt using the group key by the encryptor/decryptor;

(c-2) reading the encrypted group salt from the key storage;

(c-3) only if the first encryption result and the encrypted group salt match with each other, transmitting the publisher salt and the publisher key read from the key storage to the encryptor/decryptor, and receiving from the encryptor/decryptor a second encryption result that is generated by encrypting the publisher salt using the publisher key by the encryptor/decryptor;

(c-4) reading the encrypted publisher salt from the key storage; and (c-5) determining the device as the authorized publisher in the multicast group only if the second encryption result and the encrypted publisher salt read from the key storage match with each other.

2. The device of claim 1, wherein the security interface further performs the step of:

(e) transmitting, if the device is not determined as the authorized publisher in the step (c), a result that the encryption of the first data in response to the first request is failed to the data processing requester.

3. The device of claim 1, wherein the group salt includes identification information of the multicast group, and the publisher salt includes Identification information of the device.

4. The device of claim 1, wherein the step (c) further includes the step of:

(c-6) if a reading of the publisher key from the key storage is failed, determining that the device is not the authorized publisher in the multicast group.

5. The device of claim 1, wherein the step (c) further includes the step of:

(c-7) if the reading of the encrypted publisher salt from the key storage is failed, determining that the device is not the authorized publisher in the multicast group.

6. The device of claim 1, wherein the security interface further performs the steps of:

(f) receiving a second request for decrypting second data from the data processing requestor;

(g) determining whether or not the device is an authorized subscriber in the multicast group; and (h) transmitting the second data and the group key read from the key storage to the encryptor/decryptor if the device is determined as the authorized subscriber in the step (g), receiving from the encryptor/decryptor a second decrypted data that is generated by decrypting the second data using the group key by the encryptor/decryptor, and transmitting the second decrypted data to the data processing requestor.

7. The device of claim 6, wherein the step (g) further includes the step of:

(g-1) if a reading of the publisher key from the key storage is enabled, determining that the device is not the authorized subscriber in the multicast group.

8. The device of claim 6, wherein the security interface further performs the step of:

(i) if it is determined that the device is not the authorized subscriber in the step (g), transmitting to the data processing requestor a result that the decryption of the second data in response to the second request is failed.

9. The device of claim 3, wherein the group key is issued by the key issuing server using a group salt.

10. The device of claim 9, wherein the group salt includes identification information of the multicast group.

11. The device of claim 9, wherein the step (a) includes the step of:

(a-1) if the device is registered as the subscriber in the multicast group, receiving from the key issuing server an encrypted group salt that is generated by encrypting the group salt using the group key by the key issuing server, and storing the encrypted group salt in the key storage, wherein the second request includes the second data and the group salt, and wherein the step (g) includes the steps of:

(g-2) transmitting the group salt and the group key read from the key storage to the encryptor/decryptor, and receiving from the encryptor/decryptor a first encryption result that is generated by encrypting the group salt using the group key by the encryptor/decryptor;

(g-3) reading the encrypted group salt from the key storage;

(g-4) only if the first encryption result and the encrypted group salt match with each other, determining the device as the authorized subscriber in the multicast group.

12. The device of claim 1, wherein the encryptor/decryptor and the key storage are accessible only through the security interface.

13. The device of claim 1, wherein the encryptor/decryptor, the key storage and the security interface are provided in a security module manufactured according to any one among an Europay, MasterCard and Visa (EMV) standard and a trusted execution environment (TEE) standard.

* * * * *